United States Patent [19]

Budin et al.

[11] Patent Number: 5,034,121
[45] Date of Patent: Jul. 23, 1991

[54] APPARATUS FOR PREPARING A MACHINING LIQUID OF AN ELECTROEROSION MACHINE

[76] Inventors: Josef Budin, Via Cadogno 3, 6648 Minusio; Hugo Kutil, Zypressenstrasse 17, 8408 Winterthur; Gideon Levy, Via Locarno 52, 6616 Losone, all of Switzerland

[21] Appl. No.: 395,727
[22] Filed: Aug. 18, 1989

[30] Foreign Application Priority Data

Aug. 19, 1988 [DE] Fed. Rep. of Germany ....... 3828236

[51] Int. Cl.$^5$ .............................................. B01E 65/02
[52] U.S. Cl. ................................ 210/108; 210/321.69; 210/411

[58] Field of Search ........... 210/636, 411, 108, 321.69, 210/195.2, 257.2

[56] References Cited

U.S. PATENT DOCUMENTS 4,859,324  8/1989  Levy et al. ................ 210/321.87 X Primary Examiner—Frank Spear

[57] ABSTRACT

An apparatus for preparing a machining liquid of an electroerosion machine comprises a filter to which is supplied a concentrate flow and from which a permeate flow is drained off. The filter is constructed as a membrane filter, the clogging of which is prevented in that the concentrate flow direction is periodically reversed.

7 Claims, 2 Drawing Sheets

APPARATUS FOR PREPARING A MACHINING LIQUID OF AN ELECTROEROSION MACHINE

BACKGROUND OF THE INVENTION

The present application relates to an apparatus for preparing a working, processing or machining liquid of an electroerosion or spark erosion machine.

Electroerosion machines typically have a working container filled with a machining liquid in which a workpiece to be machined by electroerosion is immersed. In the case of wire cutting or wire erosion machines the machining liquid consists of deionized water, whereas in the case of countersinking machines it consists of hydrocarbons. Due to the abrasive removal of particles from the workpiece there is a decrease in the cleanness of the machining liquid, so that there is also a change in its electrical conductivity. In order to maintain a desired erosion quality, it is necessary to clean the machining liquid so as to keep the electrical characteristics and cleanness thereof within predetermined ranges. The prior art cleaning devices use in general filters for preparing the machining liquid and those filters have a comparatively large pore diameter. In the case of the large pore sizes of such conventional filters the filtering action is, however, not adequate to maintain the quality of the machining liquid of an electroerosion machine within a desired quality range for a period of several days. However, a reduction of the pore diameter of conventional filters in order to increase the filtration quality leads to a clogging of the filter walls.

It is generally known in the field of filter technology to use membrane filters, which have an extremely small pore cross-section compared with the pore sizes of conventional filters of other types. However, membrane filters have been considered unsuitable for coarse filtering of the concentrate in electroerosion technology because, as a result of the high solids content of the concentrate, it was feared that the membrane filter would rapidly clog.

Therefore, in the preparation of the machining liquid of electroerosion machines, membrane filters have only been used for very specialized functions, but never for cleaning or preparing the concentrates. For example, JP-OS 62-24917 discloses an apparatus for the preparation of the machining liquid of an electroerosion machine, in which use is made of a membrane filter. The known apparatus comprises a container for the machining liquid, which is subdivided into two areas by a cellophane membrane. The first one of the two areas is connected by means of a pump, downstream of which is connected a conventional filter, to the working area of the electroerosion machine, which, by means of a further pump, can be drained into the first area of the container. The second area of the container is connected by means of a yet further pump to an ion exchanger. The ion concentration in the second container area is considerably below the ion concentration in the first container area, so that the ion exchanger can be operated with a low ion density, which is favorable for its operating behavior. In this known apparatus, for the preparation of the machining liquid, a conventional filter is used for filtering the concentrate, whereas a membrane filter is used only for the adjustable reduction of the ion density for a circulation of an ion exchanger.

SUMMARY OF THE INVENTION

It is an object of the present invention to provide an improved apparatus for processing a machining liquid of an electroerosion machine, which would make it possible to maintain a high quality of the machining liquid for electroerosion for a long period of time.

This and other objects of the invention are attained by an apparatus for preparing a machining liquid of an electroerosion machine, comprising a membrane filter receiving a concentrate to filter the same and having a concentrate side and a permeate side, and means for reversing a direction of flow of said concentrate through said filter.

The invention is based on the finding that a membrane filter can be used for filtering the permeate flow of an electroerosion machine, if the filter is not only operated in so-called transverse flow technology, in which the concentrate flow moves substantially parallel to the membranes, but also if the flow direction of the concentrate flow is periodically reversed. Thus, if the concentrate flow constantly moves in the same direction along the filter membranes, then, on the flow inlet side of the membrane, a dirt cake consisting of the solids particles of the concentrate builds up, which considerably reduces the membrane efficiency. This dirt cake mainly builds up from the inlet side. This is proved by the fact that the pressure drop increases along the membrane filter.

Hitherto membrane filters have not been used for the direct filtering of the concentrate flow in electroerosion technology, because experts in the field of electroerosion machines have considered that such filters were unsuitable as a result of the afore-described rapid efficiency decrease due to the build up of the filter cake.

In the apparatus according to the present invention, the concentrate flow direction is periodically automatically reversed. On reversing the concentrate flow direction, the dirt cake which has built up in the vicinity of the concentrate flow intake side on the membrane is washed away from the latter. This makes it possible to prevent or considerably delay a clogging of the membrane filter through periodic flow direction reversal.

The removal or washing away of the dirt cake can be improved in that backflushing of the membrane filter is carried out in time synchronization with the flow direction reversal. Appropriately, the backflushing is firstly initiated and during this process the pump for the concentrate flow is switched off. Immediately the backflushing process is ended, the pump is switched on again. Advantageously, through a valve operation, the flow direction reversal takes place, i.e. the concentrate flow then travels in the opposite direction as compared with the flow direction prior to the backflushing. Since during this phase there is a very high dirt particle concentration in the "dirt circuit", it is appropriate to provide for increased disposal of the dirt particles from the dirt circuit during this phase. Thus, during this phase, a larger partial flow of the dirt circuit is passed over a fleece filter having a connection line with the membrane filter.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENT

Figure 1:
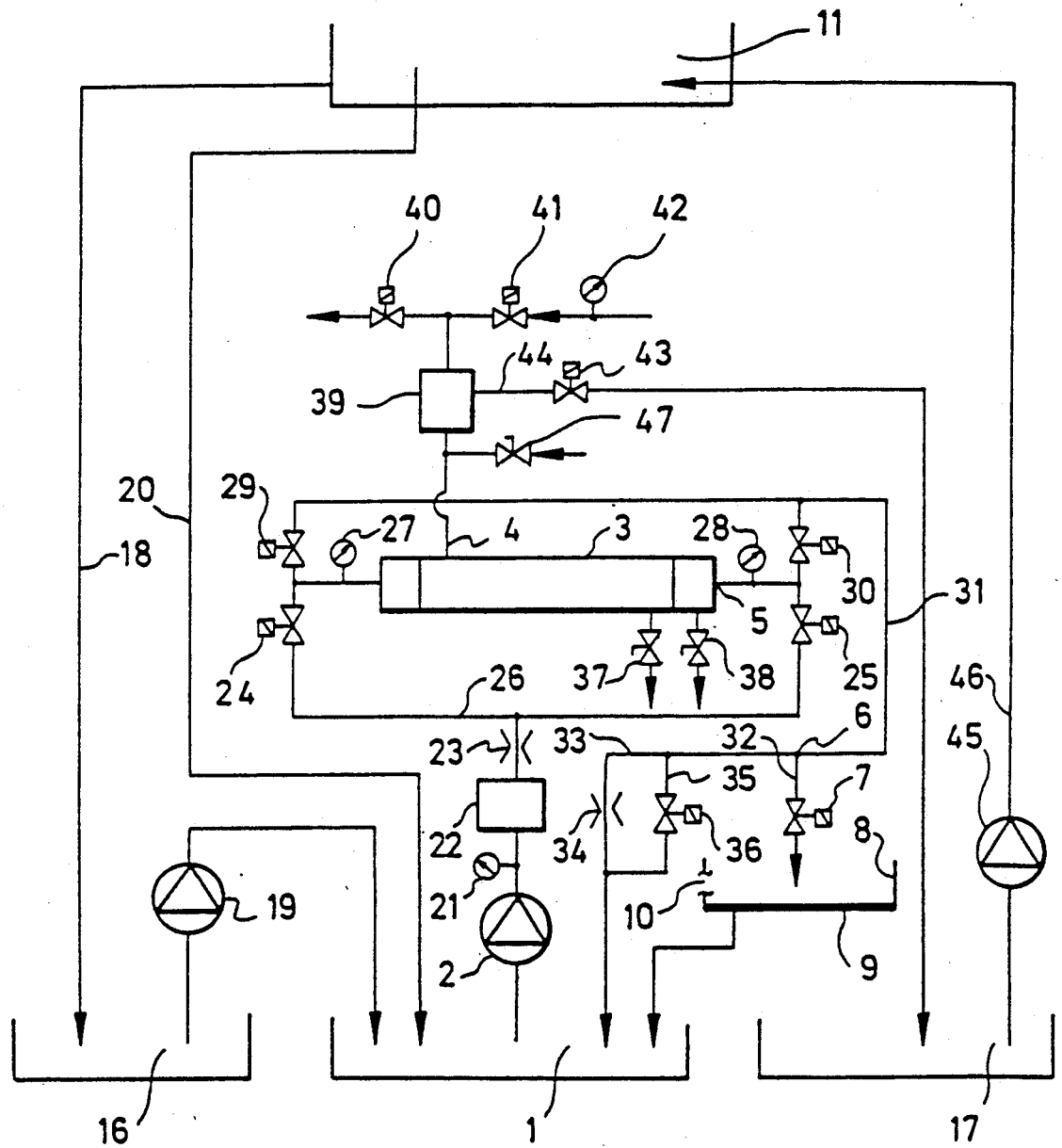
FIG. 1 is an overall diagrammatic view of an apparatus for the preparation of the machining liquid of an electroerosion machine according to the present invention.

An apparatus for preparing the machining liquid of an erosion machine shown in FIG. 1 comprises a concentrate tank 1 from which a pump 2 feeds a concentrate flow to a membrane filter 3 from which a permeate is drained off at a permeate outlet 4. The concentrate flow further enriched with solids following the branching off of the permeate, is conveyed back from a filter concentrate outlet 5b (FIG. 2) to the concentrate tank 1. Part of the returned concentrate flow is supplied downstream via a branch 31 by an electrically operable partial flow valve 7 to a disposal container 8. Disposal container 8 is constructed as a wire basket in which is inserted a fleece filter 9. The disposal container 8 is positioned above the concentrate tank 1, so that the partial concentrate flow which has passed through the fleece filter 9 of container 8 is returned to the concentrate tank 1.

Above the surface of fleece filter 9, during filtering a filter cake builds up consisting of accumulated solids which have separated from the concentrate. This filter cake reinforces the filtering action of fleece filter 9.

Disposal container 8 is provided with an overflow 10 permitting a concentrate overflow from disposal container 8 into concentrate tank 1, if the partial concentrate flow to container 8 is greater than the prepurified concentrate quantity which has trickled through the filter cake and the fleece filter 9.

By a suitable control of the partial flow valve 7, the disposal container 8 is supplied either periodically and discontinuously with larger partial flow quantities per time unit, or constantly with a smaller partial flow quantity.

Figure 2:
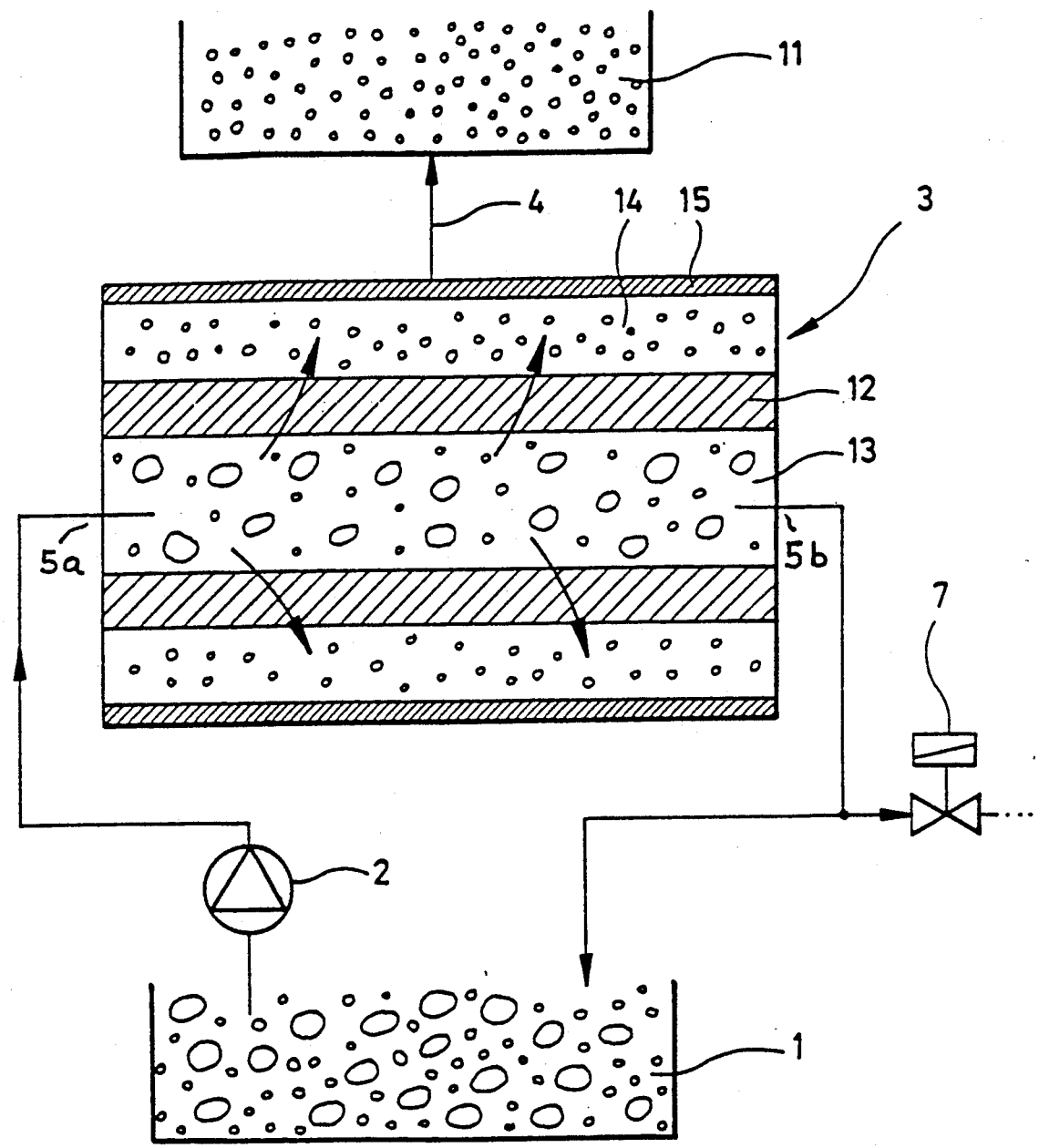
FIG. 2 is a sectional view through a membrane filter used in the apparatus according to FIG. 1.

As seen in FIG. 2 the membrane filter 3 comprises a tubular membrane 12, which separates a concentrate area 13 from a permeate area 14. Membrane filter 3 is enclosed with a cylindrical wall 15. The concentrate flow through concentrate area 13 is passed from a concentrate inlet 5a to a concentrate outlet 5b parallel to membrane 12. In the drawing a single membrane filter 3 is shown, but in a practically realized preferred embodiment a plurality of identical filter elements 3 are provided in parallel flow connection. By the construction of the membrane filter 3 as a plurality of tubular filter elements, a large filter surface with small space requirements can be achieved.

The membrane filter 3 preferably comprises hollow polypropylene fibers having a diameter of approximately 5 mm and a pore size of approximately 0.2 $\mu$m. As can be gathered from FIG. 2, the permeate outlet 4 of membrane filter 3 is connected to a permeate container of clean tank 17 from which permeate is pumped to a working container of the spark erosion machine.

Apart from the working container 11 and the concentrate tank 1, the machining liquid preparation apparatus comprises a collecting container or receiver 16 and a clean liquid tank 17. The content of working container 11 can be supplied to receiver 16 via a drain line 18. By means of a second pump 19, following the sedimentation of the concentrate, the content of receiver 16 can be pumped round into the concentrate tank 1. In addition, working container 11 is directly connected to concentrate tank 1 via a return flow line 20. Downstream of the first pump 2 is provided a pressure gauge 21, a coarse filter 22 and a shield or screen 23 which effects a division of a feed line 26 into two branches passing to two inlet valves 24, 25, respectively. The first inlet valve 24 is connected to the membrane filter 3 on one side, whilst the other inlet valve 25 is connected to the membrane filter 3 on the other side. The pressure upstream or downstream of the membrane filter 3 is monitored by a second and third pressure gauges 27, 28. Beside the inlet valves 24, 25, in the concentrate area 13 of membrane filter 3 are connected outlet valves 29, 30, which are connected via concentrate return line 31 to the concentrate tank 1. At the partial flow valve 7, the concentrate return line 31 is split into a disposal container line 32, into a shield line 33 having a shield 34 and opening into concentrate tank 1, and a pressure relief line 35 having a dirt-side pressure relief valve 36 and also extending to the concentrate tank 1. Inlet valves 24, 25 and outlet valves 29, 30 are controlled in such a way that, on opening inlet valve 24, the other inlet valve 25 is closed, whilst the outlet valve 30 is open and the outlet valve 29 facing the first inlet valve 24 is closed. Through this valve opening and closing combination a flow direction is established passing from left to right in FIG. 1. A flow direction reversal in the membrane filter can be brought about in that inlet valve 25 and outlet valve 29 are opened, whilst inlet valve 24 and outlet valve 30 are closed. Membrane filter 3 with its permeate outlet 4 is connected to a buffer container 39 for the backflushing of membrane filter 3. Buffer container 39 can be vented by means of a vent valve 40 and for cleaning the membrane filter 3 can be subject to the action of compressed air through a compressed air valve 41, whose pressure can be monitored by a fourth pressure gauge 42.

Buffer container 39 is connected to the clean liquid tank 17 by means of a return line 44 having a return valve 43. The permeate which has accumulated in the clean liquid tank 17 is returned by means of a third pump 45 via a permeate line 46 to working container 11. This permeate return to the working container preferably takes place with a delivery of approximately 50 to 60 liters/minute.

The aforementioned reversal of the flow direction by a corresponding operation of inlet valves 24, 25 and outlet valves 29, 30 is only carried out when pump 2 is switched off so as to prevent pressure shocks acting on the membrane on reversing the valves 24, 25, 29, 30. Thus, a process computer for controlling all the aforementioned valves and pumps, firstly switches off pump 2, before valve reversal takes place. Pump 2 is then switched on again, so that the flow direction is reversed. The now reversed concentrate flow direction leads to the washing away of the dirt filter cake, which has built up on the concentrate flow inlet side of the membrane of membrane filter 3.

In order to ensure constant pressure conditions at the membrane inlet and outlet and in order to prevent a drop in the filtering capacity over a period of time, the concentrate flow direction is periodically automatically reversed. Preferably the frequency of the direction reversal of the concentrate flow is a function of the on frequency or time of pump 2.

The frequency of the reversal of the flow direction can be determined by a process computer as a function of a parameter of the electroerosion process, preferably the integral over the flame cutting current. It is also possible to take account of dependencies of workpiece materials, particle compositions and predetermined technology date and electroerosion machine generator data. Apart from the integral over the flame cutting current, these additional parameters can be readily fixed by simple test in the case of a predetermined current integral.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. Apparatus for preparing a machining liquid of an electroerosion machine, comprising a filter to which is supplied a concentrate flow of the liquid and from which is drained a permeate flow of said liquid, said filter being a membrane filter through which the concentrate flow is passed substantially parallel to a membrane of said filter; and means for reversing a direction of the concentrate flow through said membrane filter.

2. Apparatus according to claim 1, and further comprising a concentrate supply line and a concentrate return line and wherein said membrane filter has a concentrate side and a permeate side, and wherein said reversing means includes two pairs of valves of which in each case one pair of said valves is connected to a concentrate-side connection of said membrane filter and one valve of each pair is connected to said concentrate supply line and the other valve of each pair is connected to said concentrate return line.

3. Apparatus according to claim 2, further comprising a pump in said concentrate supply line, said reversing means switching off said pump for the concentrate flow prior to the reversal of said valves in said pairs and switching on the pump again only after said valves have been reversed.

4. Apparatus according to claim 3, and further comprising means to control said reversing means so that the frequency of the reversal of the flow direction by said reversing means is controlled as a function of one of the on frequency and the time of operation of said pump.

5. Apparatus according to claim 2, and further comprising a backflushing device by means of which the permeate is forced from said permeate side through said membrane to the concentrate side of said membrane filter, said backflushing device being activated in a time-linked manner with an operation of said reversing means.

6. Apparatus according to claim 1, wherein a frequency of the flow direction reversal is modified as a function of a parameter of an electroerosion process.

7. Apparatus according to claim 1, wherein a frequency of the flow direction reversal is modified as a function of a pressure drop along said membrane filter.

* * * * *